United States Patent
Huang et al.

(10) Patent No.: US 7,453,557 B2
(45) Date of Patent: Nov. 18, 2008

(54) TEMPERATURE COMPENSATING METHOD AND APPARATUS FOR AN OPTICAL DISC DEVICE

(75) Inventors: Shih-Jung Huang, Taoyuan County (TW); Shang-Hao Chen, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 97 days.

(21) Appl. No.: 11/382,932

(22) Filed: May 12, 2006

(65) Prior Publication Data

US 2006/0262668 A1    Nov. 23, 2006

(30) Foreign Application Priority Data

May 23, 2005    (TW) .............................. 94116834 A

(51) Int. Cl.
*G01N 21/00* (2006.01)
(52) U.S. Cl. .................. 356/73; 369/47.5; 369/116
(58) Field of Classification Search .................. 356/73; 372/34; 369/13.26, 47.5, 47.51, 47.52, 47.53, 369/116
See application file for complete search history.

(56) References Cited

U.S. PATENT DOCUMENTS 6,856,633 B2 *    2/2005    Nasu et al. .................... 372/34
2004/0027949 A1 *    2/2004    Matsuura et al. ......... 369/47.51

* cited by examiner

*Primary Examiner*—Kara E Geisel
*Assistant Examiner*—Abdullahi Nur
(74) *Attorney, Agent, or Firm*—Winston Hsu

(57) ABSTRACT

A temperature compensating method and apparatus uses a front sensor to measure a first power of a light-emitting unit emitting a light, and a thermal sensor to measure the temperature of the light-emitting unit. The temperature is inputted into an I/O unit to figure out a second power from the equations of the temperature and power. Then, the first and second powers are inputted into a controller to adjust the power of the light-emitting unit, or the second powers are inputted into a write strategy to change an output clock to adjust the energy of the light without changing the power of the light-emitting unit. The optical disc device has the effect of the temperature compensation.

19 Claims, 6 Drawing Sheets

TEMPERATURE COMPENSATING METHOD AND APPARATUS FOR AN OPTICAL DISC DEVICE

BACKGROUND OF THE INVENTION

1. Field of the Invention

The present invention relates to a temperature compensating method and apparatus for an optical disc device, and more particularly to a method and apparatus in which a thermal sensor is used to detect the temperature of a laser diode to find out the proper power relative to the temperature and determine the power or clock for achieving the optimum record quality.

2. Description of the Prior Art

The adjusting operation of a light source in an optical disc device is to adjust the power of the light source to keep the power output constant. The light source of a conventional optical disc device is a laser diode. A front sensor is disposed near the laser diode to detect the power of the laser diode any time, and transmits the detected power to a controller controlling the emission of the laser diode to keep the power constant every time. However, the factor of deciding the record quality doesn't all depend on keeping the power constant, actually. Because the laser pick-up head has the temperature variation during recording, the temperature variation will change the wavelength of the light emitted from the laser pick-up head.

As shown in FIG. 1, the dye coated on a disc appears different sensitivities S for different wavelengths λ of light sources. Therefore, in order to achieve the optimum record quality, it is necessary for dicks of different materials to record with the wavelength relative to high sensitivity. However, with the increase of the recording time, the temperature of the laser pick-up head increases to cause the wavelength of the light emitted from the laser pick-up head to change. Consequently, the laser pick-up head loses the proper wavelength relative to high sensitivity to cause bad record quality. Therefore, it is desired to solve the problem of recording bad quality due to the temperature variation of the laser pick-up head.

SUMMARY OF THE INVENTION

One object of the invention is to provide a temperature compensating method and apparatus for an optical disc device, which figures out the optimum recording power for a disc or determines the output clock by measuring the temperature of a light-emitting unit with a thermal sensor to adjust the recording power and improve the record quality.

Another object of the invention is to provide a temperature compensating method and apparatus for an optical disc device, in which various equations of the temperature and power for different dyes of the disc are stored in a memory to be adaptable to discs with various dyes.

For achieving the above objects, the present invention provides a temperature compensating method, which uses a front sensor to measure a first power of a light-emitting unit emitting a light and a thermal sensor to measure the temperature of the light-emitting unit. The temperature is inputted into an I/O unit (input and output unit) to figure out a second power from the equations of the temperature and power. Then, the first and second powers are inputted into a controller to adjust the power of the light-emitting unit to compensate the difference between the first and second power, or the second powers are inputted into a write strategy to change an output clock to adjust the energy of the light without changing the power of the light-emitting unit. Thus the optical disc device has the effect on the temperature compensation.

The present invention provides a temperature compensating apparatus including a light-emitting unit and a front sensor. The front sensor is disposed near the light-emitting unit to measure a first power of the light-emitting unit emitting a light. A thermal sensor by the light-emitting unit measures the temperature of the light-emitting unit. An I/O unit coupled to the thermal sensor receives the temperature to figure out a second power. A first controller connected with the front sensor receives the first power. A second control unit connected with the I/O unit receives the second power to determine an electric output pattern. If the electric output pattern is a power output, the second control unit is a controller. If the electric output pattern is a clock output, the second control unit is a write strategy unit. A third control unit receives the output of the second control unit. A laser driver coupled to the third control unit is used to drive the light-emitting unit.

The temperature compensating method comprises steps: measuring the first power of the light-emitting unit emitting the light; measuring the temperature of the light-emitting unit; figuring out a second power relative to the temperature; inputting the first power into the first control unit; inputting the second power into the second control unit to change the electric output pattern; and controlling a drive unit by means of the third control unit.

If the electric output pattern is a power output, the first control unit and the second control unit are the same controller, and the third control unit is a write strategy unit. If the electric output pattern is a clock output, the first control unit is a controller, and the second control unit and the third control unit are the same write strategy unit.

Further features and advantages of the invention, as well as the structure and operation of various embodiments of the invention, are described in detail below with reference to the accompanying drawings.

DETAILED DESCRIPTION

Figure 1:
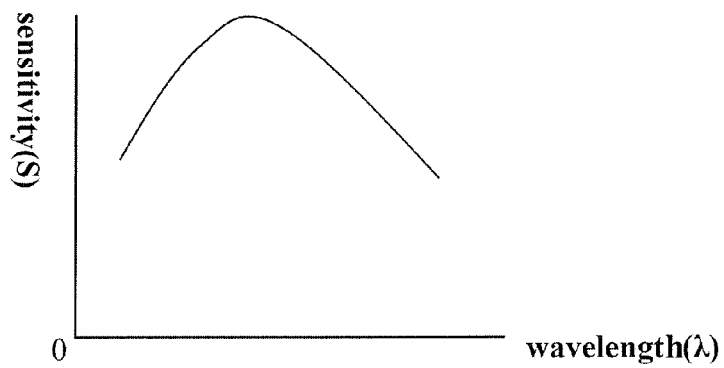
FIG. 1 is a schematic view shown the relation between the wavelength of the light and the sensitivity of the dye coated on a disc.
Figure 2:
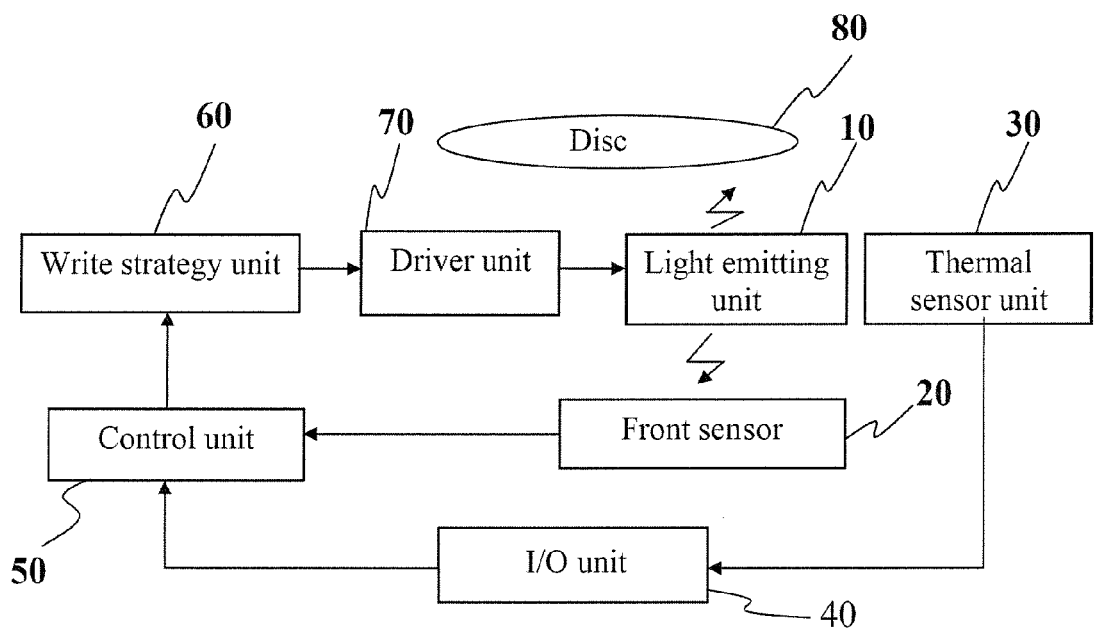
FIG. 2 is a functional block diagram of the temperature compensating apparatus for an optical disc device according to the first embodiment of the invention.

Referring to FIG. 2, a temperature compensating apparatus for an optical disc device according to the first embodiment of the invention is shown, which is used to write/read an optical disc 80 and includes a light-emitting unit 10, a front sensor 20, a thermal sensor unit 30, an I/O unit 40, a control unit 50, a write strategy unit 60, and a driver unit 70. In the first embodiment of the invention, the light-emitting unit 10 is a laser diode, the front sensor 20 is a light power sensor, the thermal sensor unit 30 is a thermal sensor, the I/O unit 40 is an algorithm device, the control unit 50 is a controller, the write strategy unit 60 is a clock generator, and the driver unit 70 is a laser driver. The front sensor 20 and the thermal sensor unit 30 are individually disposed by the light-emitting unit 10. The front sensor 20 is coupled to the control unit 50, and the thermal sensor unit 30 is coupled to the I/O unit 40 connected with the control unit 50. The control unit 50 is connected with the write strategy unit 60 coupled to the driver unit 70, and the driver unit 70 is finally coupled to the light-emitting unit 10 to form a circuit.

The temperature compensating apparatus of the invention uses the front sensor 20 to measure a first power of the light-emitting unit 10, and uses the thermal sensor unit 30 to measure a temperature of the light-emitting unit 10. Then, the temperature inputs the I/O unit 40 to figure out a second power relative to the temperature. The first power and the second power are inputted into the control unit 50 at one time to check the difference between two powers, and then transmitted to the write strategy unit 60 to control the driver unit 70 so as to determine the exact output power of the light-emitting unit 10. The compensated output power of the light-emitting unit 10 will be the most proper output power corresponding to the temperature to achieve the perfect record effect.

The I/O unit 40 calculates the equations of the temperature and the power. The equation is the relation about a reference temperature, a reference power, and an adjusting ratio, such as $P=P_0[a(T-T_0)^2+b(T-T_0)+c]x\%$, wherein P is the output power, $P_0$ is the reference power, T is the temperature of the light-emitting unit 10, which is measured by the thermal sensor unit 30, $T_0$ is the reference temperature, x% is the adjusting ratio, and a, b, and c are constants. The above-mentioned equation is one of embodiments of the invention, which are stored in the I/O unit 40. So a relative power P can be figured out if a temperature is measured, and the pattern or size of the electric output of the light-emitting unit 10 is further able to be changed. In the present embodiment, the electric output is the size of the output power to compensate for the shortage of the output power caused by the change of the temperature, which changes the wavelength of the light so that the light not enough sensitive to the dyes of the disc causes bad recording situations.

Figure 3:
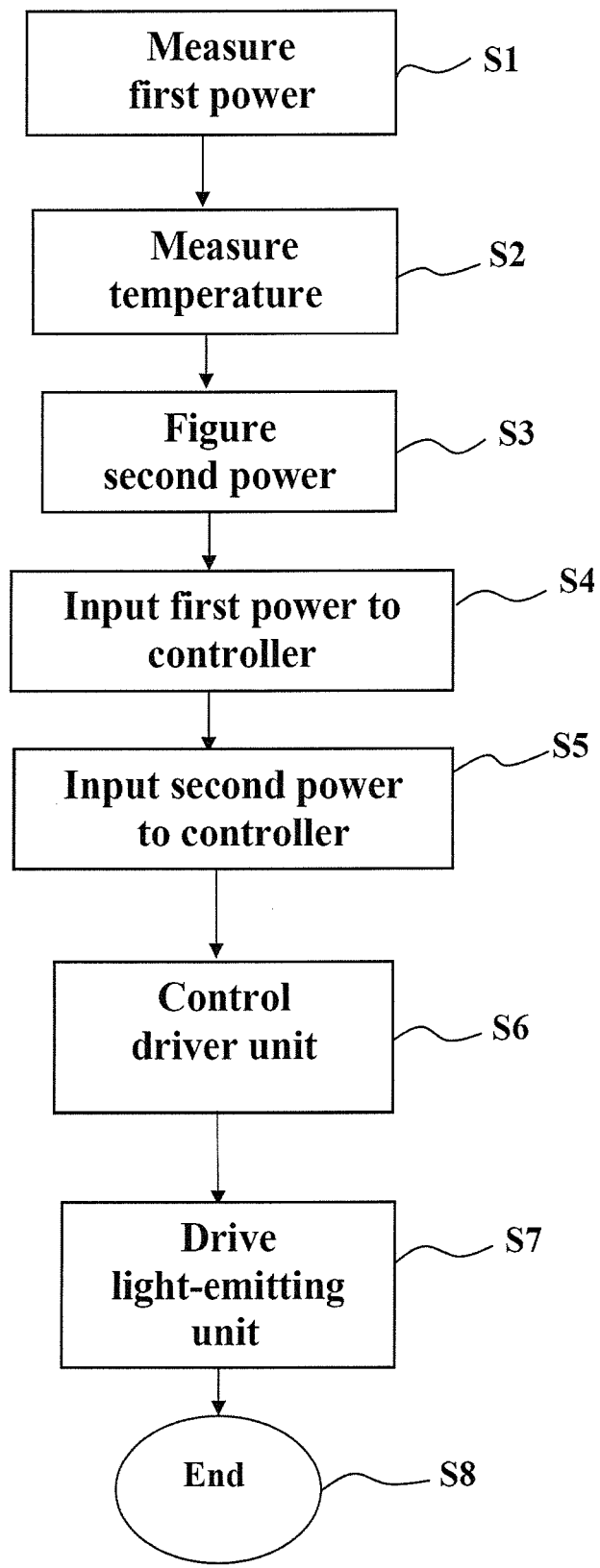
FIG. 3 is a flowchart of the temperature compensating method for an optical disc device according to the first embodiment of the invention.

Referring to FIG. 3, the flowchart of the temperature compensating method for an optical disc device according to the first embodiment of the invention is shown. The method comprises steps as follows:

Step S1: measuring the first power of the light-emitting unit 10 emitting the light;
Step S2: measuring the temperature of the light-emitting unit 10;
Step S3: figuring the second power relative to the temperature;
Step S4: inputting the first power into the control unit 50;
Step S5: inputting the second power into the control unit 50, and controlling the write strategy unit 60;
Step S6: controlling the driver unit 70 by the write strategy unit 60;
Step S7: driving the light-emitting unit 10 to emit a light; and
Step S8: ending.

By measuring the temperature of the light-emitting unit 10, the second power relative to the temperature is figured out, and the driver unit 70 will adjust the next output power of the light-emitting unit 10 to compensate for the change of the wavelength of the light caused the shortage of the sensitivity to the dyes of the disc. Increasing the output power provides enough energy for achieving the best recording situations.

Figure 4A:
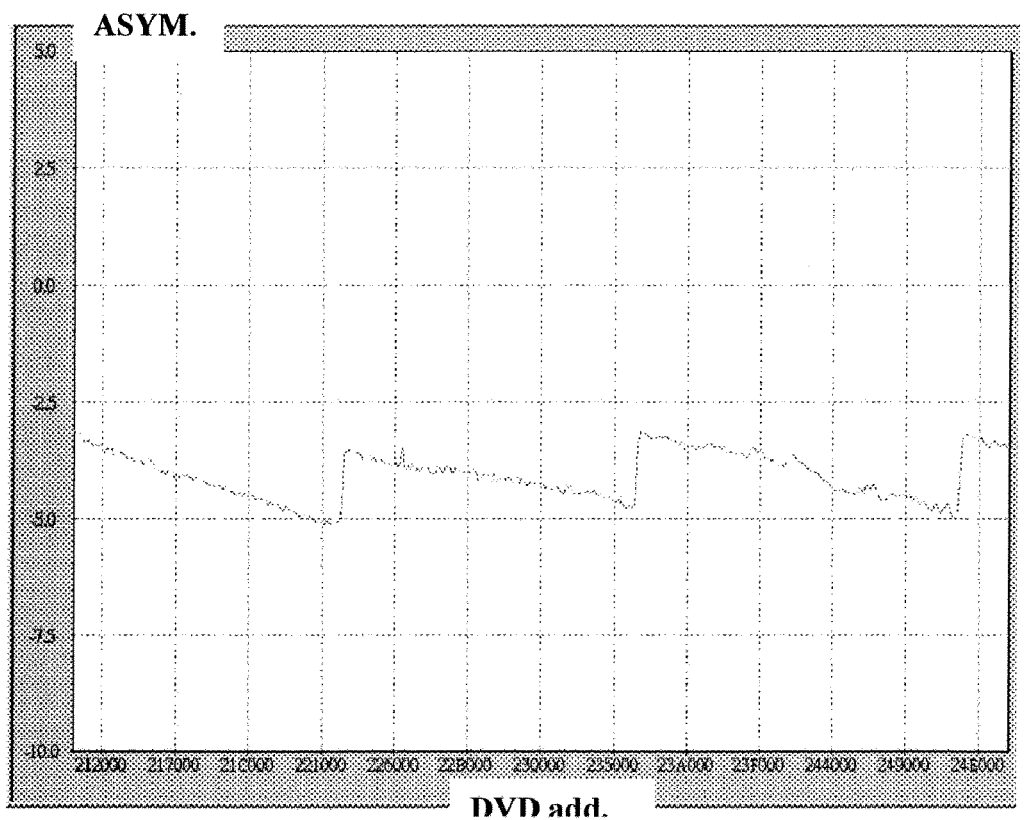
FIG. 4a is an experimental asymmetry diagram without the temperature compensating method.
Figure 4B:
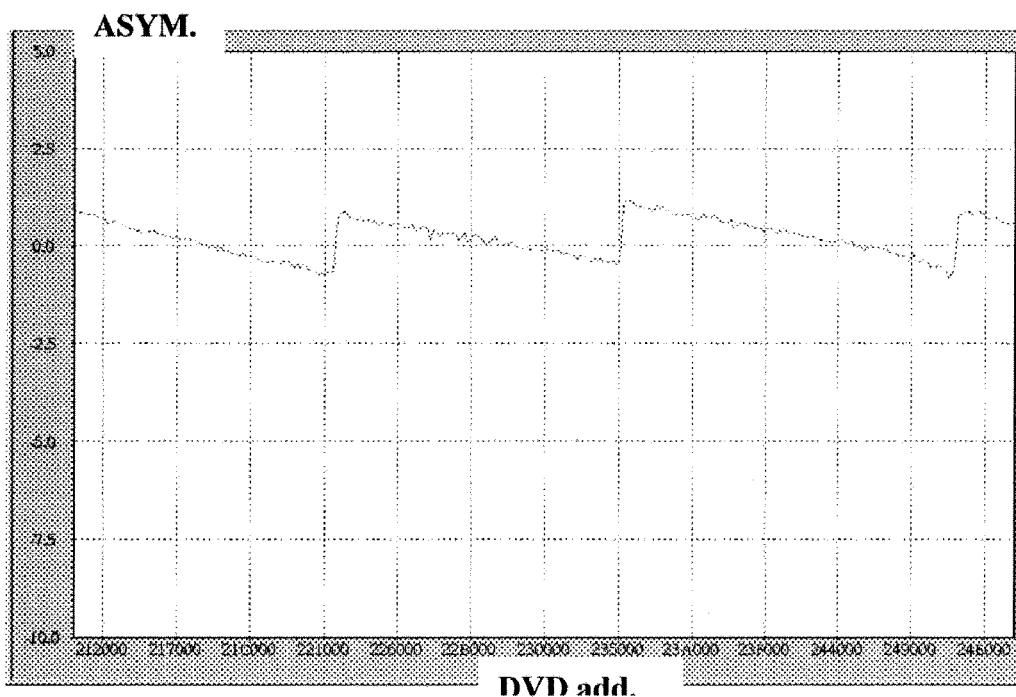
FIG. 4b is an experimental asymmetry diagram using the temperature compensating method of the invention.

Referring to FIG. 4a and FIG. 4b, the experimental asymmetry on an 8× DVD is shown, wherein X-axis is the address of DVD and Y-axis is asymmetry (Asym). The asymmetry means the comparison of signals of marks and spaces on a disc. 0% asymmetry is a desired goal. In FIG. 4a, the asymmetry is recorded on an 8× DVD without the temperature compensating method of the invention. In FIG. 4b, the asymmetry is recorded on an 8× DVD by use of the temperature compensating method of the invention. According to the above-mentioned equation, if $T_0=53°$ C., $P_0=37.1$ mW, a=0, b=1/256, c=1, and x=100, an output power can be calculated from the equation when T=63° C., as follows:

$$P=P_0[a(T-T_0)^2+b(T-T_0)+c]x\%=37.1 \ [0*(63-53)^2+(1/256)*(63-53)+1]* \ 100\%=38.6 \ (mW).$$

Therefore, FIG. 4a is compared with FIG. 4b. FIG. 4a shows about −5% asymmetry which uses 37.1 mW output powers to directly record disc without temperature compensation. The asymmetry is below the desired goal of asymmetry. In view of experimental data of FIG. 4a, the output power doesn't follow the temperature to change, and is always 37.1 mW no matter when the temperature is 53° C. or 63° C. If the output power uses 37.1 mW to record disc at 63° C., the record effect doesn't reach the effect using 37.1 mW to record disc at 53° C. However, by means of the temperature compensating method which records a disc with the 38.6 mW output power, FIG. 4a shows that the asymmetry raises and reaches about 0% asymmetry. In view of experimental data of FIG. 4b, the output power is 37.1 mW at 53° C., but the output power is compensated to 38.6 mW when the temperature rises to 63° C. The desired power for the best record can be achieved to gain the effect of the temperature compensation.

Figure 5:
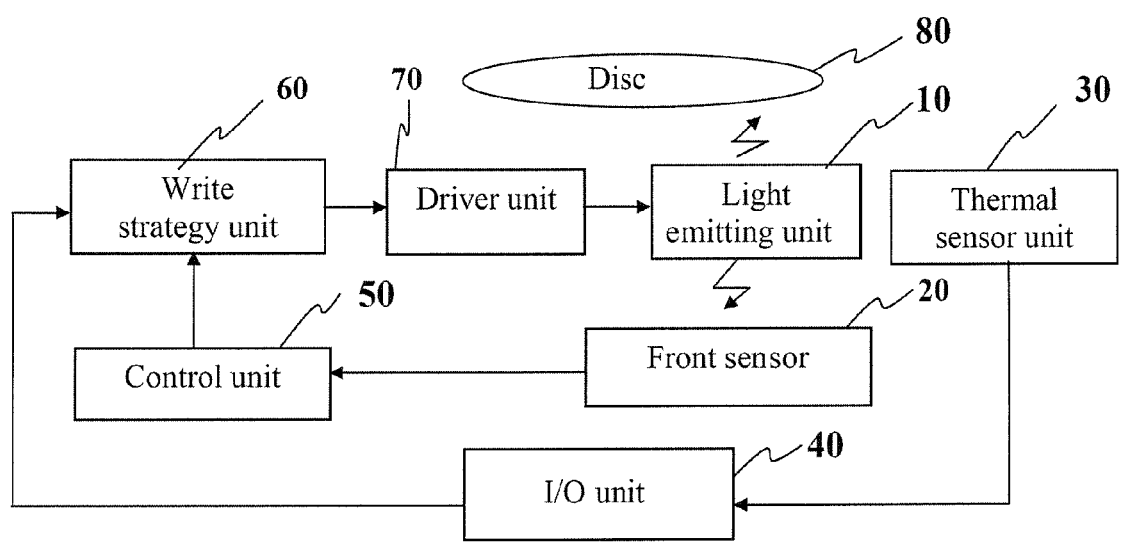
FIG. 5 is a functional block diagram of the temperature compensating apparatus for an optical disc device according to the second embodiment of the invention.

Please refer to FIG. 5, a temperature compensating apparatus for an optical disc device according to the second embodiment of the invention is shown. The primary components of the second embodiment are similar to those of the first embodiment, i.e. FIG. 2, and the details are not further described and can be revisited in the above description. The main difference is that the second power calculated by the I/O unit 40 directly inputs into the write strategy unit 60. Therefore, the size of the first power isn't changed, and the output clock will be changed to increase the record energy which equals to that the first power multiples the clock. The record energy will meet the record energy of the new temperature to gain the best record effect.

Figure 6:
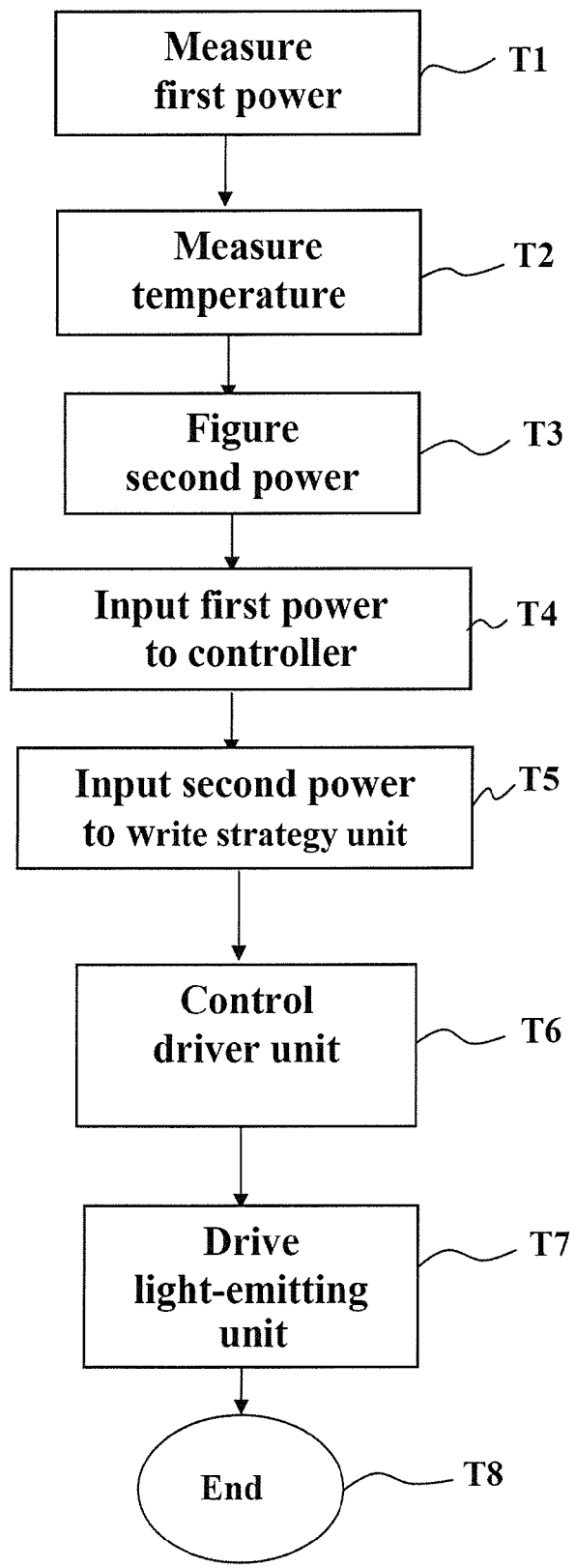
FIG. 6 is a flowchart of the temperature compensating method for an optical disc device according to the second embodiment of the invention.

Referring to FIG. 6, the flowchart of the temperature compensating method for an optical disc device according to the second embodiment of the invention is shown. The method comprises steps as follows:

Step T1: measuring the first power of the light-emitting unit 10 emitting the light;
Step T2: measuring the temperature of the light-emitting unit 10;
Step T3: figuring the second power relative to the temperature;
Step T4: inputting the first power into the control unit 50;
Step T5: inputting the second power into the write strategy unit 60;
Step T6: controlling the driver unit 70 by the write strategy unit 60;
Step T7: driving the light-emitting unit 10 to emit a light; and
Step T8: ending.

By measuring the temperature of the light-emitting unit 10, the second power relative to the temperature is figured out, and the driver unit 70 will adjust the next output clock of the light-emitting unit 10 to compensate for the change of the wavelength of the light caused the shortage of the sensitivity to the dyes of the disc. Changing the output clock provides enough energy for achieving the best recording situations.

Figure 7:
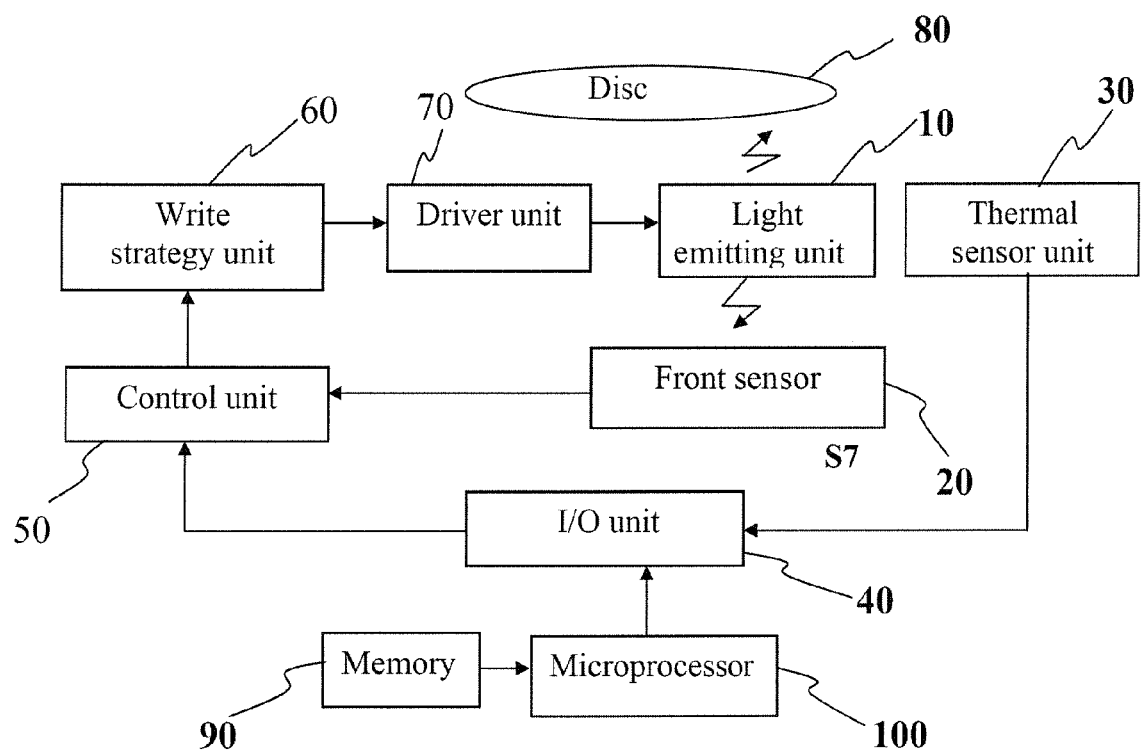
FIG. 7 is a functional block diagram of the temperature compensating apparatus for an optical disc device according to the third embodiment of the invention.

Referring to FIG. 7, a temperature compensating apparatus for an optical disc device according to the third embodiment of the invention is shown. The primary components of the third embodiment are similar to those of the first embodiment, and the details are not further described and can be revisited in the above description. The main difference is that the apparatus further includes a memory 90 in which many equations of the temperature and the power for various dyes on a disc are stored. After the optical disc device discriminates the kind of dyes on the disc, a microprocessor 100 searches the corresponding equation for the calculation of the I/O unit 40. Thus, the invention can meet the demand of various discs. In general, the kind of dyes stored in the control data zone of a disc can be read by an optical disc device to discriminate.

Therefore, the temperature compensating method and apparatus of the present invention uses a front sensor to measure a first power of a light-emitting unit, and a thermal sensor to measure the temperature of the light-emitting unit. The temperature is inputted into an I/O unit to figure out a second power or an output clock relative to the temperature from the equations of the temperature and the power. Then, a write strategy can be determined to achieve the optimum record effect. Furthermore, the memory can store many equations of the temperature and the power for various dyes of discs to meet the demands of many discs. The defect of changing power caused by the wavelength shift of the light due to the temperature variation can be solved to gain the best record effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A temperature compensating method for an optical disc, comprising the steps of:
   discriminating a kind of dyes on the optical disk;
   searching an equation corresponding to the kind of dyes on the optical disk;
   storing the equation in an I/O unit;
   measuring a first power of a light-emitting unit emitting a light;
   measuring a temperature of the light-emitting unit;
   inputting the temperature into an I/O unit;
   figuring out a second power relative to the temperature with the equation;
   inputting the first power and the second power into a first control unit;
   checking a difference between the first power and the second power to change an output pattern of signals; and
   controlling a driver unit with the output pattern of signals to determine an output power of the light-emitting unit by means of a second control unit.

2. The method of claim 1, wherein the second control unit is a write strategy unit, and the output pattern is an output power.

3. The method of claim 1, wherein the first control unit is a controller, the second control unit is a write strategy unit, and the output pattern is an output clock.

4. The method of claim 1, wherein the equation is an equation of the temperature and a power and the equation comprises a reference temperature, a reference power and an adjusting ratio.

5. The method of claim 4, wherein the equation is $P=P0[a(T-T0)2+b(T-T0)+c]x\%$, P is an output power, P0 is the reference power, T is the temperature of the light-emitting unit, T0 is the reference temperature, x% is an adjusting ratio, and a, b, and c are constants.

6. The method of claim 5, wherein the figuring step further comprises using a memory to store a plurality of the equations.

7. The method of claim 1, wherein the light-emitting unit is a laser diode.

8. The method of claim 1, wherein the temperature measuring step further comprises using a thermal sensor to measure the temperature.

9. The method of claim 1, wherein the power measuring step further comprises using a front sensor to measure the first power.

10. A temperature compensating apparatus for an optical disc, comprising:
    a light-emitting unit;
    a front sensor disposed by the light-emitting unit to measure a first power of light-emitting unit;
    a thermal sensor unit disposed by the light-emitting unit to measure a temperature of light-emitting unit;
    a memory to store a plurality of equations;
    an I/O unit coupled to the thermal sensor unit to receive the temperature and output a second power;
    a microprocessor for searching an equation corresponding to a kind of dyes on the optical disk stored in the memory, and storing the equation in the I/O unit;
    a first control unit coupled to the front sensor to receive the first power transmitted from the first sensor;
    a second control unit coupled to the I/O unit to receive the second power transmitted from the I/O unit and determine an output pattern with the equation;
    a third control unit receiving the output of the second control unit; and
    a driver unit coupled to the third control unit to drive the light-emitting unit.

11. The apparatus of claim 10, wherein the light-emitting unit is a laser diode.

12. The apparatus of claim 10, wherein the front sensor is a power sensor.

13. The apparatus of claim 10, wherein the thermal sensor unit is a thermal sensor.

14. The apparatus of claim 10, wherein the first control unit and the second control unit are identical, the third control unit is a write strategy unit, and the output pattern is an output power.

15. The apparatus of claim 10, wherein the second control and the third control unit are an identical write strategy unit, and the output pattern is an output clock.

16. The apparatus of claim 10, wherein the equation is $P=P0[a(T-T0)2+b(T-T0)+c]x\%$ to figure out the second power, wherein P is an output power, P0 is the reference power, T is the temperature of the light-emitting unit, T0 is the reference temperature, x% is an adjusting ratio, and a, b, and c are constants.

17. The apparatus of claim 16, wherein the memory stores the plurality of the equations of the temperature and the output power.

18. The apparatus of claim 10, wherein the output pattern is an output power.

19. The apparatus of claim 10, wherein the output pattern is an output clock.

* * * * *